(12) United States Patent
Moreton

(10) Patent No.: US 6,679,089 B2
(45) Date of Patent: Jan. 20, 2004

(54) TYPE OF AUTOMOBILE ANTI-THEFT DEVICE

(75) Inventor: Paul Moreton, Tainan (TW)

(73) Assignee: Robert A. Vito, Berwyn, PA (US)

( * ) Notice: Subject to any disclaimer, the term of this patent is extended or adjusted under 35 U.S.C. 154(b) by 0 days.

(21) Appl. No.: 10/052,211

(22) Filed: Oct. 19, 2001

(65) Prior Publication Data

US 2003/0074934 A1 Apr. 24, 2003

(51) Int. Cl.$^7$ ............... B60R 25/02; B62H 5/04; G05G 5/00
(52) U.S. Cl. ............... 70/209; 70/225; 70/237; 70/238
(58) Field of Search ............... 70/209–211, 225, 70/226, 237, 238

(56) References Cited

U.S. PATENT DOCUMENTS

| | | | |
|---|---|---|---|
| 1,364,068 A | 1/1921 | Bader | 70/212 |
| 1,400,415 A | 12/1921 | Callahan | 70/211 |
| 1,428,649 A | 9/1922 | Miller | 70/211 |
| 2,716,336 A | 8/1955 | Ross | 70/238 |
| 3,190,090 A | 6/1965 | Zaidener | 70/203 |
| 3,401,543 A | 9/1968 | Lewis | 70/183 |
| 3,690,131 A | 9/1972 | Davis | 70/203 |
| 3,898,823 A | 8/1975 | Ludeman | 70/200 |
| 4,008,590 A | 2/1977 | Berkowitz et al. | 70/424 |
| 4,696,172 A | 9/1987 | Farrow | 70/238 |
| 4,699,238 A | 10/1987 | Tamir | 180/287 |
| 4,779,435 A | 10/1988 | Farrow | 70/238 |
| 5,089,055 A | 2/1992 | Nakamura | 70/202 |
| 5,113,674 A | 5/1992 | LiCausi | 70/209 |
| 5,119,651 A | 6/1992 | Yang | 70/52 |
| D330,844 S | 11/1992 | Chang | D8/331 |
| 5,197,308 A * | 3/1993 | Pazik | 70/209 |
| 5,259,222 A | 11/1993 | Jang | 70/209 |
| 5,267,458 A | 12/1993 | Heh | 70/238 |
| 5,275,030 A | 1/1994 | Cole | 70/209 |
| 5,299,438 A * | 4/1994 | Chen | 70/209 |
| 5,327,753 A * | 7/1994 | White | 70/209 |
| 5,329,793 A | 7/1994 | Chen | 70/209 |
| 5,461,891 A | 10/1995 | Noel | 70/18 |
| 5,488,844 A | 2/1996 | Winner | 70/18 |
| D369,738 S | 5/1996 | Hull et al. | D8/331 |
| 5,513,506 A | 5/1996 | Ricalde | 20/209 |
| D372,718 S | 8/1996 | Biasotti et al. | D8/346 |
| 5,566,560 A | 10/1996 | LiCausi | 70/18 |
| 5,598,142 A | 1/1997 | Winner, Jr. | 340/438 |
| 5,600,979 A | 2/1997 | Winner et al. | 70/252 |
| 5,604,384 A | 2/1997 | Carlo et al. | 307/10.5 |
| 5,613,383 A | 3/1997 | Banez | 70/209 |
| 5,635,899 A | 6/1997 | Carlo et al. | 340/426.3 |
| 5,636,538 A * | 6/1997 | Openiano | 70/209 |
| 5,653,133 A | 8/1997 | Passantino | 70/238 |
| D383,372 S | 9/1997 | Winner | D8/346 |
| 5,671,620 A | 9/1997 | Carvey et al. | 70/238 |
| 5,673,575 A | 10/1997 | Carlo et al. | 70/209 |

(List continued on next page.)

*Primary Examiner*—John B. Walsh
(74) *Attorney, Agent, or Firm*—Volpe and Koeing, P.C.

(57) ABSTRACT

An automobile anti-theft device that has its parts straddling over the spoke(s) of a steering wheel, with one side tightly wrapped around by the device, Traditional steering wheel locks, such as the trademarked product The Club®, PTO registration number 872404, allows a maximum of two cuts on the steering wheel to remove the anti-theft device and thus is not a very effective theft deterrent. The present anti-theft device eliminates the two-cuts needed to easily steal because one side of the steering wheel is completely wrapped around, allowing no cuts to be made by the would-be-thieves. Theft can only be attained by extreme force to break the present device, destroying the key/lock mechanism, or chopping away the steering wheel from the steering column.

17 Claims, 3 Drawing Sheets

U.S. PATENT DOCUMENTS

| | | | |
|---|---|---|---|
| 5,677,668 A | 10/1997 | Winner, Jr. | 340/438 |
| 5,704,233 A | 1/1998 | Farshad | 70/238 |
| 5,709,113 A | 1/1998 | Godfrey | 70/233 |
| D391,142 S | 2/1998 | Winner | D8/333 |
| 5,730,008 A | 3/1998 | Case et al. | 70/18 |
| 5,735,149 A | 4/1998 | Winner, Jr. | |
| 5,755,123 A | 5/1998 | Winner, Jr. | 70/209 |
| 5,765,415 A * | 6/1998 | Savinsky | 70/209 |
| 5,778,709 A * | 7/1998 | Hsu | 70/209 |
| D398,830 S | 9/1998 | Winner | D8/333 |
| 5,826,448 A | 10/1998 | Graham | 70/209 |
| 5,836,185 A * | 11/1998 | Openiano | 70/209 |
| 5,836,186 A | 11/1998 | Winner, Jr. | 70/209 |
| 5,842,361 A | 12/1998 | Banez | 70/209 |
| 5,855,128 A | 1/1999 | Voiculescu | 70/209 |
| 5,865,044 A | 2/1999 | Wu | 70/209 |
| 5,870,912 A | 2/1999 | Vito | 70/202 |
| 5,881,587 A | 3/1999 | Vito | 70/202 |
| 5,887,464 A | 3/1999 | Perez | 70/209 |
| 5,901,586 A | 5/1999 | Hale | 70/18 |
| 5,906,121 A | 5/1999 | Mankarious | 70/199 |
| 5,921,115 A | 7/1999 | Winner | 70/18 |
| D412,826 S | 8/1999 | Calpito | D8/331 |
| 5,953,941 A * | 9/1999 | Freund | 70/199 |
| 5,996,721 A | 12/1999 | Winner | 70/209 |
| 6,029,483 A | 2/2000 | Daniels | 70/199 |
| 6,058,749 A * | 5/2000 | Rekemeyer | 70/226 |
| 6,116,065 A | 9/2000 | Hale | 70/200 |
| D432,390 S | 10/2000 | Geringer et al. | D8/331 |
| 6,131,426 A | 10/2000 | Tarnofsky | 70/209 |
| 6,192,724 B1 | 2/2001 | Vito | 70/209 |
| 6,202,456 B1 | 3/2001 | Vickers | 70/209 |
| 6,212,920 B1 | 4/2001 | Winner | 70/382 |
| 6,223,568 B1 | 5/2001 | Wu | 20/209 |
| 6,223,569 B1 | 5/2001 | Wu | 70/209 |
| 6,230,527 B1 | 5/2001 | Wu | 70/209 |
| 6,240,753 B1 | 6/2001 | Wu | 70/209 |
| 6,389,857 B1 * | 5/2002 | Meekma et al. | 70/209 |

* cited by examiner

TYPE OF AUTOMOBILE ANTI-THEFT DEVICE

FIELD OF THE INVENTION

The present invention relates generally to the design of an automobile anti-theft device. More particularly, the present invention provides a locking device on the steering wheel of an automobile where the only way to remove current device from a steering wheel when the device is locked is to physically tamper with the device itself, such as cutting off the stick/pipe, or destroying the key/lock mechanism part of current device.

BACKGROUND OF THE INVENTION

Traditional automobile anti-theft device, such as the trademarked product The Club®, PTO registration number 1872404, though easy to use, has not been a very effect deterrent on car theft. Because products like The Club have two single-hook pieces pressed against the opposite ends of the inside rim of a steering wheel, would-be-thieves can easily remove the device by making up to two cuts on the steering wheel.

Given that the material for the steering wheel handle is usually plastic or rubber with optional leather or wood trim, making cuts on the steering wheel rim does not pose a great obstacle to the would-be-thieves.

In most circumstances, only one cut is needed to remove a traditional anti-theft device like The Club. The gist of The Club's anti-theft functionality lies in the concurrent outward pressure by the two single-hook pieces on the opposite ends of a steering wheel's inside rim. Once two cuts on the rim around one single-hook piece are made, the section of the rim can be removed; the concurrent outward pressure can no longer exist. The body of The Club can be easily pulled away from the steering wheel.

To remove a traditional anti-theft device by only one cut, would-be-thieves cut on the rim next to one single-hook, then jiggle the hook out from the gap created by pulling open the broken steering wheel. Once one hook is out, the whole device can be pulled out without difficulty.

OBJECTS AND SUMMARY OF THE INVENTION

The present invention utilizes two double-hook pieces on opposite ends of a steering wheel, with one end further wrapped around by a third wrapping piece, to make cutting the wrapped section of the rim impossible, unless extreme force is applied to current invention.

On one side of the steering wheel where a first double-hook piece is put into position, two cuts around the double-hook piece must be done if attempting to remove a section of the rim. As opposed to the traditional type, if only one cut is made next to any one of the double-hooks, it is very hard to jiggle the double-hook piece out from the opening. Therefore, taking out current device can only be done by making two cuts around one double-hook. Since the two hooks on the double-hook piece are an integrated piece with means of re-enforcement such as a metal plate, the cuts in the area within the two hooks are not possible unless extreme force is applied to break the structure of the double-hook piece.

On the other side of the steering wheel where a second double-hook piece is put into position, a wrapping piece is attached to the outside rim of a steering wheel. In order for would-be-thieves to cut the area within the two hooks, the solid sheet structure of the wrapping piece must be cut through, along with the inherent structure of the double-hook piece and the re-enforcement plate. Such arrangement adds more difficulty to any attempt of cutting a section of the rim off, greatly reducing the chances of current device being removed from the steering wheel.

BRIEF DESCRIPTION OF THE DRAWINGS

The accompanying drawings, which are incorporated in and constitute a part of this specification, illustrate the preferred embodiment of the invention and together with the description, serve to explain the principles of the invention. A brief description of the drawings is as follows.

DETAILED DESCRIPTION OF THE PREFERRED EMBODIMENT

Figure 1:
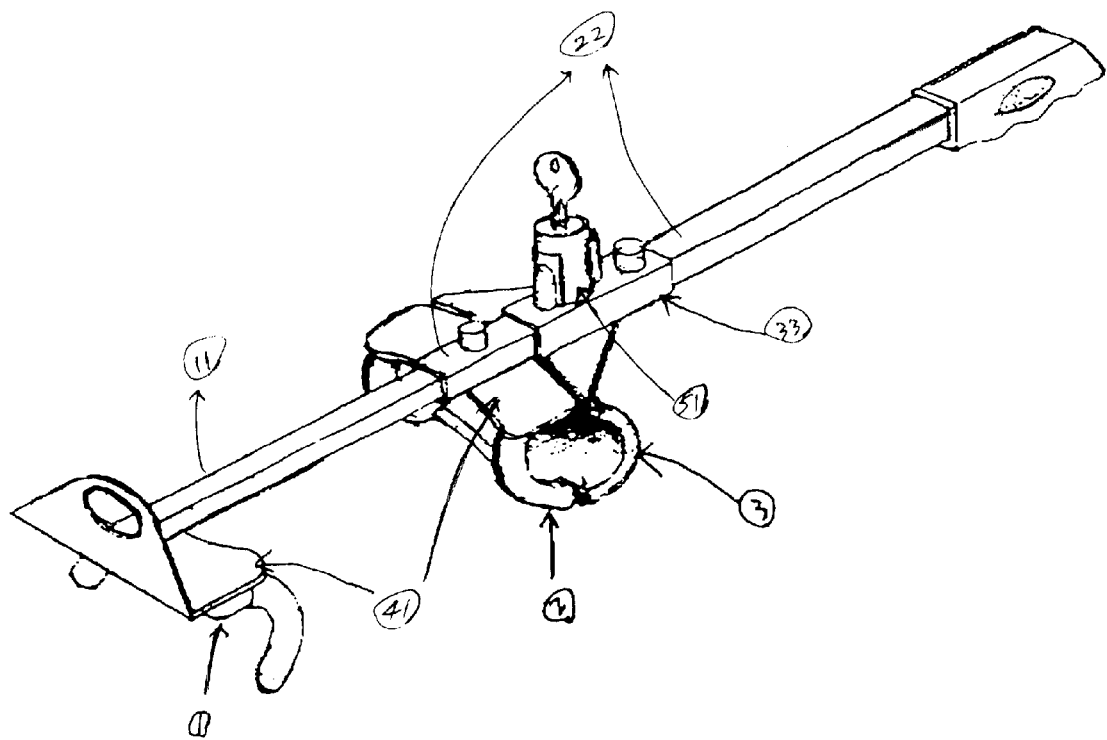
FIGS. 1 and 2 show a completed embodiment of present invention.
Figure 2:
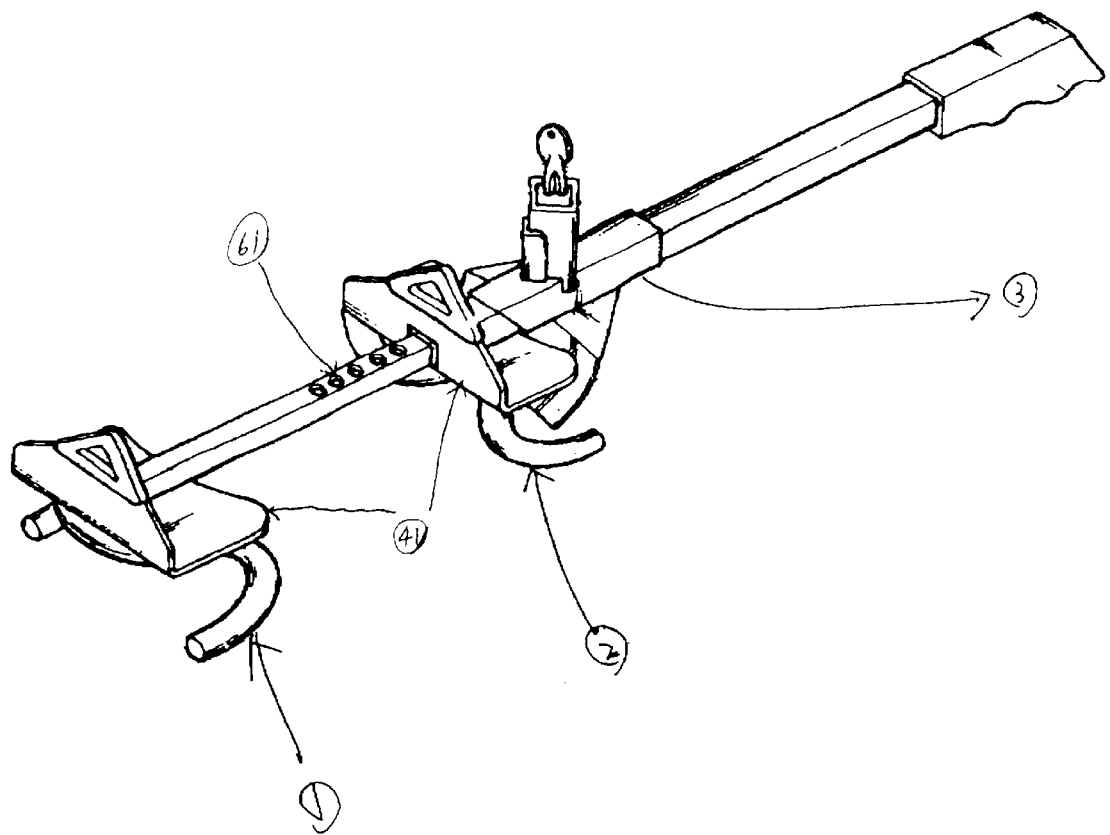
Figure 3:
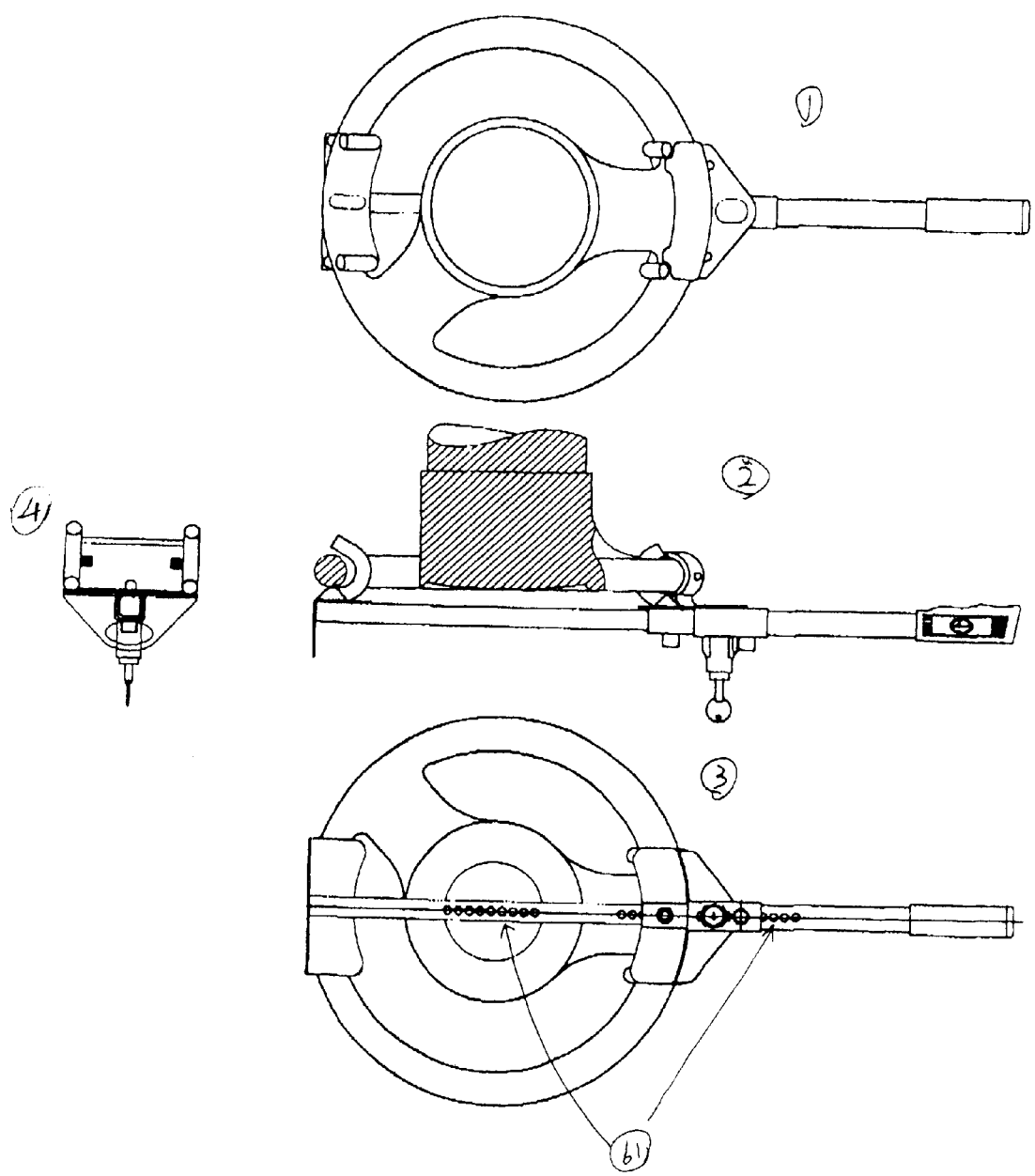
FIG. 3 shows the top-down views and side-views of present invention when used on a steering wheel.

FIGS. 1, 2 and 3 show preferred embodiment of present invention.

In FIG. 1, the first double-hook piece 1 is situated and attached under the first rigid pipe 11. The second double-hook piece 2 is situated and attached under the second rigid pipe 22. The wrapping piece 3 is situated and attached under the third rigid pipe 33.

Wrapping piece 3 is made up of a curved concave sheet of rigid material so that it wraps around the outside rim of a steering wheel when in locking position.

A plurality of holes 61 is shown on FIG. 2 and view 3 of FIG. 3. Both rigid pipes 11 and 22 have these holes 61 so that the bolt of key/lock mechanism 51 can be inserted through these holes 61, when locked, to fit steering wheels of varying sizes.

The two hooks on the double-hook piece 1 and 2 are so spaced that they straddle over the spoke(s) of a steering wheel, as shown in FIG. 3.

The way to utilize the current invention is to straddle the two hooks of the first double-hook piece 1 and second double-hook piece 2 over the spokes of a steering wheel. In this manner the current invention will always be locked on a steering wheel, unless extreme force is applied to break the current invention.

More often than not, the spokes on a steering wheel do not allow the current invention to have both double-hook pieces 1 & 2 straddled over two spokes at the same time. The preferred method of using the current invention is then to straddle the two hooks of the double-hook piece 2 over one of the spokes, as shown in views 1 and 3 of FIG. 3. Such use makes sure that greater difficulty will be faced by would-be-thieves to remove the current invention from a steering wheel because the part of the rim wrapped in by second double-hook piece 2 and wrapping piece 3 would be nearly impossible to cut away. It will be appreciated from this disclosure that the cross-section of the first, second, and third rigid pipes 11, 22, 33 may be in the share of a circle, a triangle, a rectangle, a pentagon, a hexagon, or other polygons. It will also be appreciated from this disclosure that the first, second, and third rigid pipes 11, 22, 33, the first and second double-hook pieces 1,2, and the key/lock mechanism 51 can be formed of iron, steel, or other rigid and firm material so that breakage can only be attained by extreme force.

What is claimed is:

1. An automobile anti-theft device adapted for use with a steering wheel having at least one spoke and a rim with an inside surface, comprising:
   a. a first double-hook piece having a first rigid pipe extending to one side of a first double hook part, the first double hook part including two prongs;

b. a second double-hook piece having a second rigid pipe extending to one side of a second double hook part, the second double hook part including two prongs, said first rigid pipe is slidably placed inside said second rigid pipe, wherein said first and second double-hook parts of said first and second double-hook pieces are roughly mirror images of each other, so that said first and second double-hook parts can be placed along and pressed against the inside surface of the rim of the steering wheel, with the two prongs of at least one of said first and second double-hook parts straddling over one of the at least one spoke of the steering wheel;

c. a wrapping piece attached to a third rigid pipe that houses a key/lock mechanism, said second rigid pipe is slidably placed inside said third rigid pipe; and d. a separate plate is disposed on each of said first and second double-hook pieces and covers a portion of the rim between the two prongs to reinforce the steering wheel against cutting alone the portion.

2. The anti-theft device of claim 1, wherein said wrapping piece is so shaped and can be placed along and pressed against an outside surface of the rim of the steering wheel, so that the second double-hook part of said second double-hook piece and said wrapping piece grip a section of the rim therebetween when said key/look mechanism is in a locked position.

3. The anti-theft device of claim 2, wherein said first and second rigid pipes have a plurality of holes thereon, so that a bolt on said key/lock mechanism can be inserted through the holes when said key/lock mechanism is in a locked position.

4. The anti-theft device of claim 3, wherein the cross-section of said first, second, and third rigid pipes has the shape of one of a circle, a triangle, a rectangle, a pentagon, and a hexagon.

5. The anti-theft device of claim 3, wherein said first and second double-hook pieces are made of at least one of iron and steel.

6. An anti-theft device adapted for securing a steering wheel of a vehicle, the steering wheel including a rim, the anti-theft device comprising:

a first elongated member;

a first double-hook disposed on the first elongated member;

a second elongated member slidably receives the first elongated member therein;

a second double-hook disposed on the second elongated member;

a collar slidably disposed over the second elongated member;

a wrap member attached to the collar, the wrap member being adapted to, in combination with the second double-hook, generally secure a portion of the rim therebetween when the anti-theft device is in an installed configuration; and a locking mechanism adapted to detachably secure the collar to the second elongated member such that the first and second elongated members are secured together when the anti-theft device is in the installed configuration wherein the first and second double-hooks are engaged with generally opposite portions of the rim.

7. The anti-theft device of claim 6, wherein the first and second double-hooks are each adapted to engage an inner surface of the rim.

8. The anti-theft device of claim 6, wherein each of the first and second double-hooks includes a plate adapted to cover a portion of the rim to reinforce the portion.

9. The anti-theft device of claim 6, wherein each of the first and second double-hooks include first and second hooks, wherein when the anti-theft device is in the installed configuration at least one of the first and second double-hooks is engaged with the rim and positioned with the first and second hooks on opposite sides of a spoke of the steering wheel.

10. The anti-theft device of claim 6, further comprising a handle disposed on the first double-hook, the handle being oriented generally perpendicular to a plane defined by the rim of the steering wheel when the anti-theft device is in the installed configuration.

11. The anti-theft device of claim 6, wherein a free end of the second elongated member is positioned outside of a steering wheel perimeter defined by the rim when the anti-theft device is in the installed configuration.

12. An anti-theft device adapted for securing a steering wheel of a vehicle, the steering wheel including a rim, the anti-theft device comprising:

a first elongated member;

a first double-hook disposed on the first elongated member adapted to receive a portion of the rim, the first double-hook having first and second hooks and a first plate adapted to cover a first portion of the rim when the anti-theft device is in an installed configuration, located between the first and second hooks, to reinforce the first portion;

a second elongated member slidably receives the first elongated member therein;

a second double-hook disposed on the second elongated member, the second double-hook having third and fourth hooks and a second plate adapted to cover a second portion of the rim, located between the third and fourth hooks when the anti-theft device is in the installed configuration, to reinforce the second portion; and a locking mechanism adapted to detachably secure the first and second elongated members when the anti-theft device is in the installed configuration wherein the first and second double-hooks are engaged with generally opposite portions of the rim.

13. The anti-theft device of claim 12, wherein when the anti-theft device is in the installed configuration the first and second double-hooks are engaged with the rim and positioned with the first and second hooks on opposite sides of a spoke of the steering wheel.

14. The anti-theft device of claim 12, wherein when the anti-theft device is in the installed configuration the first and second double-hooks are engaged with the rim and positioned with the third and fourth hooks on opposite sides of a spoke of the steering wheel.

15. The anti-theft device of claim 12, further comprising a handle disposed on the first double-hook, the handle being oriented generally perpendicular to a plane defined by the rim of the steering wheel when the anti-theft device is in the installed configuration.

16. The anti-theft device of claim 15, wherein the wrap member comprises a curved sheet of rigid material adapted to be positioned around an outside portion of the rim.

17. The anti-theft device of claim 12, further comprising:

a collar slidably disposed over the second elongated member; and a wrap member attached to the collar, the wrap member being adapted to, in combination with the second double-hook, generally secure a portion of the rim therebetween when the anti-theft device is in an installed configuration.

* * * * *